United States Patent
Nichols

(10) Patent No.: US 12,436,775 B2
(45) Date of Patent: Oct. 7, 2025

(54) COMPUTERIZED SYSTEMS AND METHODS FOR MODIFIED HOST-CLIENT DEVICE CONFIGURATIONS AND CONNECTIONS

(71) Applicant: Resideo LLC, Golden Valley, MN (US)

(72) Inventor: Steven C. Nichols, Plymouth, MN (US)

(73) Assignee: Resideo LLC, Golden Valley, MN (US)

( * ) Notice: Subject to any disclaimer, the term of this patent is extended or adjusted under 35 U.S.C. 154(b) by 0 days.

(21) Appl. No.: 18/434,332

(22) Filed: Feb. 6, 2024

(65) Prior Publication Data
US 2024/0281262 A1 Aug. 22, 2024

Related U.S. Application Data

(60) Provisional application No. 63/486,392, filed on Feb. 22, 2023.

(51) Int. Cl.
  *G06F 9/44* (2018.01)
  *G06F 8/61* (2018.01)
  *G06F 9/445* (2018.01)

(52) U.S. Cl.
  CPC ............ *G06F 9/44505* (2013.01); *G06F 8/61* (2013.01)

(58) Field of Classification Search
  CPC ..................... G06F 1/32; G06F 9/44
  See application file for complete search history.

(56) References Cited

U.S. PATENT DOCUMENTS

| | | |
|---|---|---|
| 6,189,040 B1 | 2/2001 | Oohara |
| 7,373,426 B2 | 5/2008 | Jinmei et al. |
| 8,811,294 B2 | 8/2014 | Sheth et al. |
| 9,935,789 B2 * | 4/2018 | Fausak ............... H04L 63/0807 |
| 2020/0042355 A1 * | 2/2020 | Krishnan ............ G06F 9/5011 |

FOREIGN PATENT DOCUMENTS

CN 111565176 B 4/2022

* cited by examiner

*Primary Examiner* — Keshab R Pandey
(74) *Attorney, Agent, or Firm* — Greenberg Traurig, LLP; Nicholas Martin; David J. Dykeman

(57) ABSTRACT

Disclosed are systems and methods that provide a novel framework for programmatically modifying device capabilities of devices within a location-monitoring system to create unique, specifically configured host-client device connections to effectuate monitoring of the location. The disclosed framework can effectuate modifications of devices to alter their type of device operational capabilities—a host device can be configured to operate as a client and/or a host-proxy for another host, and a client device and be configured to operate as a host, and the like. The disclosed framework enables devices to be programmed such that non-native capabilities are provided to devices that modify how they operate within a monitoring system, as well as how they interact with other devices within such system.

20 Claims, 6 Drawing Sheets

COMPUTERIZED SYSTEMS AND METHODS FOR MODIFIED HOST-CLIENT DEVICE CONFIGURATIONS AND CONNECTIONS

RELATED APPLICATION(S)

This application claims priority to and the benefit of U.S. Provisional Application No. 63/486,392, filed Feb. 22, 2023, which is incorporated herein by reference in its entirety.

FIELD OF THE DISCLOSURE

The present disclosure is generally related to a establishing a host-client device connection within a location-monitoring system, and more particularly, to programmatically modifying device capabilities of devices within a location-monitoring system to create unique, specifically configured host-client device connections to effectuate monitoring of the location.

BACKGROUND

Many conventional communication networks employ a star architecture of devices. That is, one central device operates as a central hub for all other devices to connect to and communicate with. The central device is commonly referred to as a host, and other devices that connect to the host are commonly referred to as clients.

SUMMARY OF THE DISCLOSURE

According to some configurations, to bind a client to a host, a common method is to put the host in a special "enroll" mode, then via initiation by a client, the client can perform a binding operation which enables the establishment of a connection by the client to the host.

As network configurations adapt to real-world environments, and communication networks move away from the rigid structure of star architectures, mechanisms are needed for nimble network architectures that can adapt how devices interact and how such devices act and/or operate. For example, in some network configurations, a device may need to operate as a host, whereas in some network configurations, the same device may need to operate as a client to another host device. This, however, may not be intuitive to a network installer.

Therefore, according to some embodiments, the disclosed systems and methods provide a novel framework that enables the dynamic and/or automatic configuration of devices within a network environment. As discussed herein, in some embodiments, the disclosed framework can effectuate modifications of device configurations and operations to alter their type of device operational capabilities—i.e., a host device can be configured to operate as a client and/or a host-proxy for another host, and a client device and be configured to operate as a host, and the like. The disclosed framework enables devices to be programmed such that non-native capabilities are provided to devices that modify how they operate within a monitoring system, as well as how they interact with other devices within such system.

According to some embodiments, for purposes of this disclosure, the referenced "monitoring system" can be any type of known or to be known network-based and/or network-configured system that can interact with other devices and/or provide event-based monitoring and action for a location. For example, the monitoring system can be a security system, climate system (e.g., heating, cooling and ventilation (HVAC), for example), and the like. Moreover, according to some embodiments, the monitoring system can effectuate any type of host-client relationship within any type of known or to be known Internet-of-Things (IoT) environment, such that the disclosed functionality can improve and/or enhance the capabilities in the manner such IoT devices can communication, and which manner they do communicate, as discussed herein.

According to some embodiments, a location, as discussed herein, can be any type of definable geographic or physical area, such as, but not limited to, a building, structure, home, room, yard, patio, garage, and the like, or some combination thereof.

According to some embodiments, a method is disclosed for programmatically modifying device capabilities of devices within a location-monitoring system to create unique, specifically configured host-client device connections to effectuate monitoring of the location. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for programmatically modifying device capabilities of devices within a location-monitoring system to create unique, specifically configured host-client device connections to effectuate monitoring of the location.

In accordance with some embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
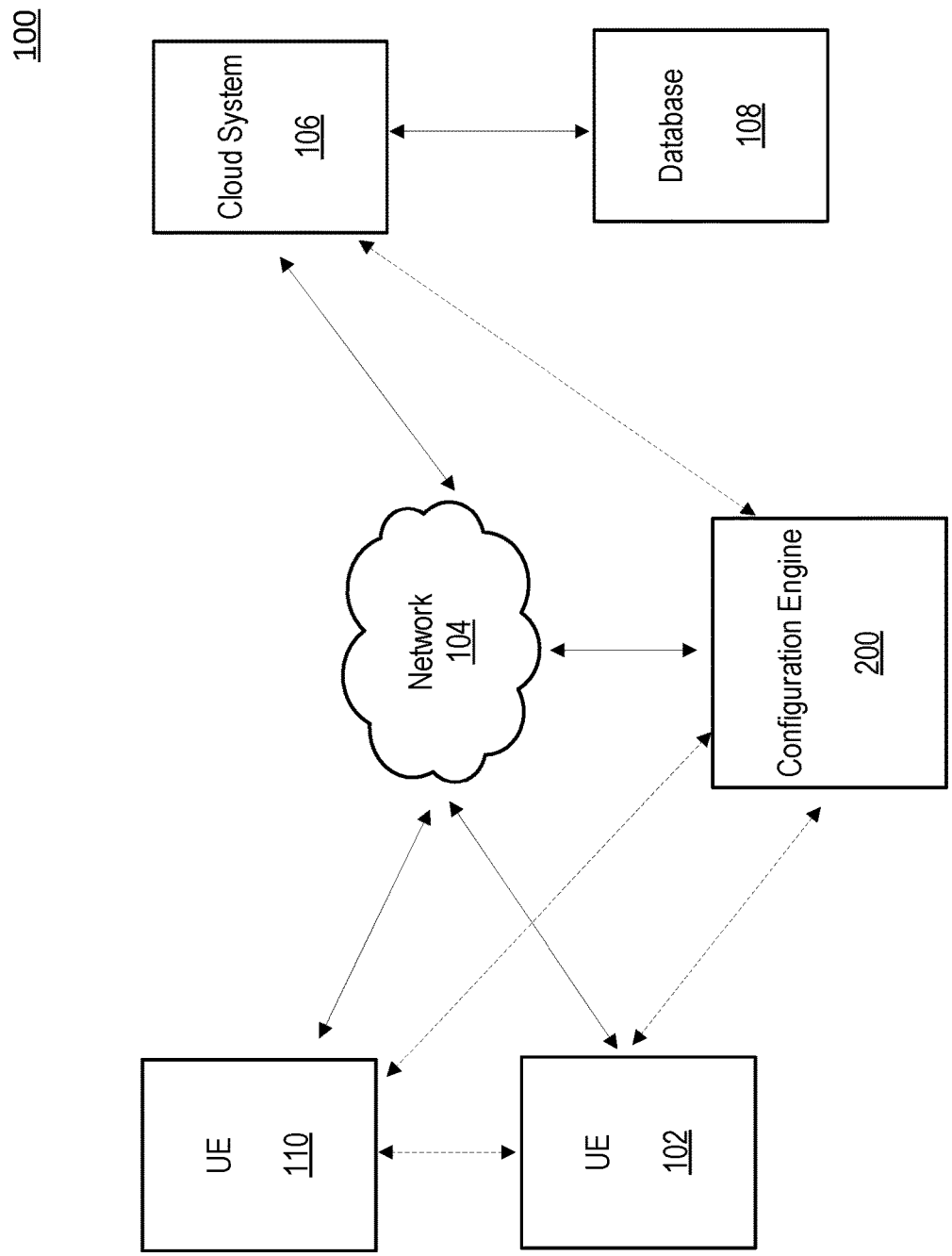
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. With reference to FIG. 1, system 100 is depicted which includes user equipment (UE) 102 and UE 110 (e.g., a client device, as mentioned above and discussed below in relation to FIG. 6), network 104, cloud system 106, database 108 and configuration engine 200. It should be understood that while system 100 is depicted as including such components, it should not be construed as limiting, as one of ordinary skill in the art would readily understand that varying numbers of UEs, peripheral devices, sensors, cloud systems, databases and networks can be utilized; however, for purposes of explanation, system 100 is discussed in relation to the example depiction in FIG. 1.

According to some embodiments, UEs 102 and 110 can be any type of device, such as, but not limited to, a mobile phone, tablet, laptop, sensor, Internet of Things (IoT) device, autonomous machine, and any other device equipped with a cellular or wireless or wired transceiver. In some embodiments, UEs 102 and 110 can be a device associated with an individual (or set of individuals) for which disclosed services are being provided. In some embodiments, UEs 102 and 110 may correspond to a device of a security provider, network provider, content provider, HVAC or climate-control related entity (e.g., a HVAC provider, whereby the device can be and/or can have corresponding sensors 110, as discussed herein), and the like.

In some embodiments, UE 102 can be a peripheral device that can be connected to UE 110 (or vice versa), and can be any type of peripheral device, such as, but not limited to, a wearable device (e.g., smart watch), printer, speaker, sensor, and the like. In some embodiments, another peripheral device (not shown) can be connected to UEs 102 and/or 110. In some embodiments, a peripheral device can be any type of device that is connectable to another device at the location via any type of known or to be known pairing mechanism, including, but not limited to, Bluetooth™, Bluetooth Low Energy (BLE), NFC, and the like.

According to some embodiments, UEs 102 and/or 110 can be a sensor that can be associated with a location of system 100. In some embodiments, such sensors can be, for example, but are not limited to, cameras, glass break detectors, motion detectors, door and window contacts, heat and smoke detectors, carbon monoxide ($CO_2$) detectors, passive infrared (PIR) sensors, time-of-flight (ToF) sensors, and the like. In some embodiments, the sensors can be associated with devices associated with the location of system 100, such as, for example, lights, smart locks, garage doors, smart appliances (e.g., thermostat, refrigerator, television, personal assistants (e.g., Alexa®, Nest®, for example)), smart phones, smart watches or other wearables, tablets, personal computers, and the like, and some combination thereof. Thus, the sensors can be, wholly or in part, part of an IoT sensor network. For example, the sensors can include the sensors on UE 102 and/or 110 (e.g., smart phone, a paired smart watch, and the like).

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a location monitoring and control system provider (e.g., Resideo®), which has associated network resources hosted on the internet or private network (e.g., network 104), which enables (via engine 200) the temperature management discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of UE 102/device 112 and the UE 102/device 112, sensors 110, and the services and applications provided by cloud system 106 and/or configuration engine 200.

In some embodiments, for example, cloud system 106 can provide a private/proprietary climate management platform, whereby engine 200, discussed infra, corresponds to the novel functionality system 106 enables, hosts and provides to a network 104 and other devices/sensors/platforms operating thereon.

Figure 4:
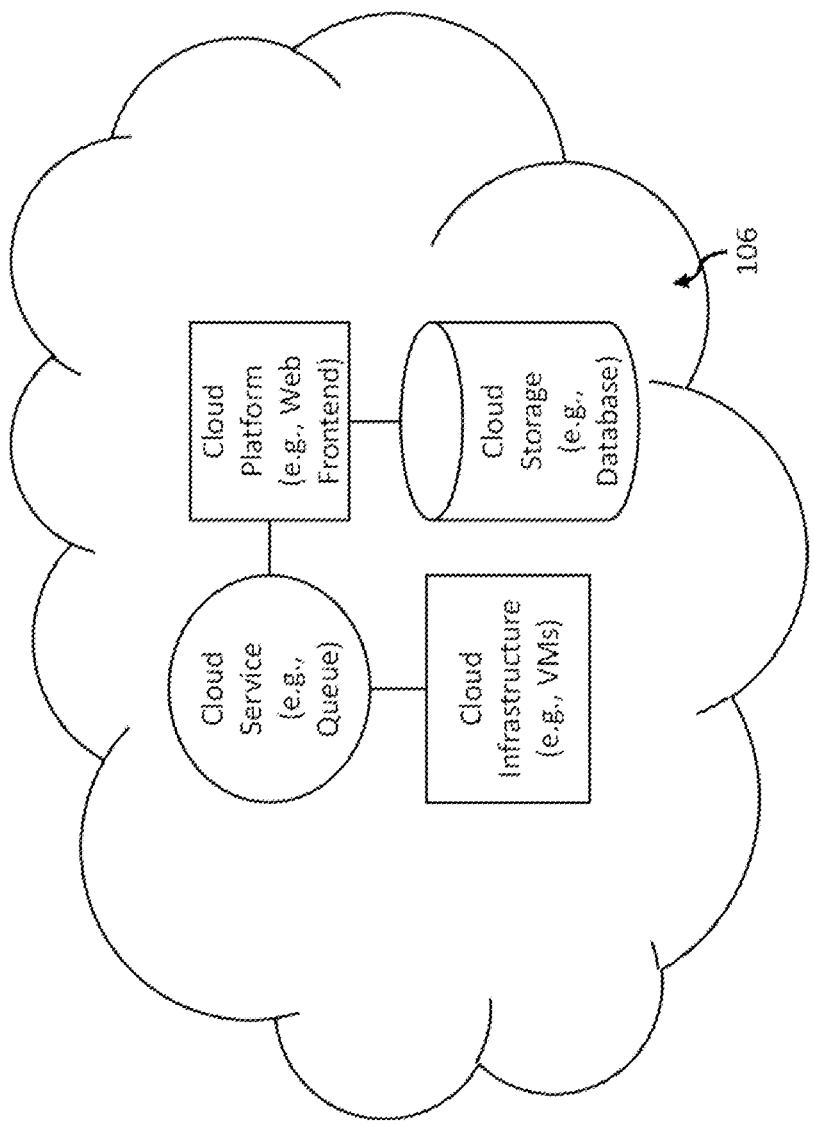
FIG. 4 depicts an exemplary implementation of an architecture according to some embodiments of the present disclosure.
Figure 5:
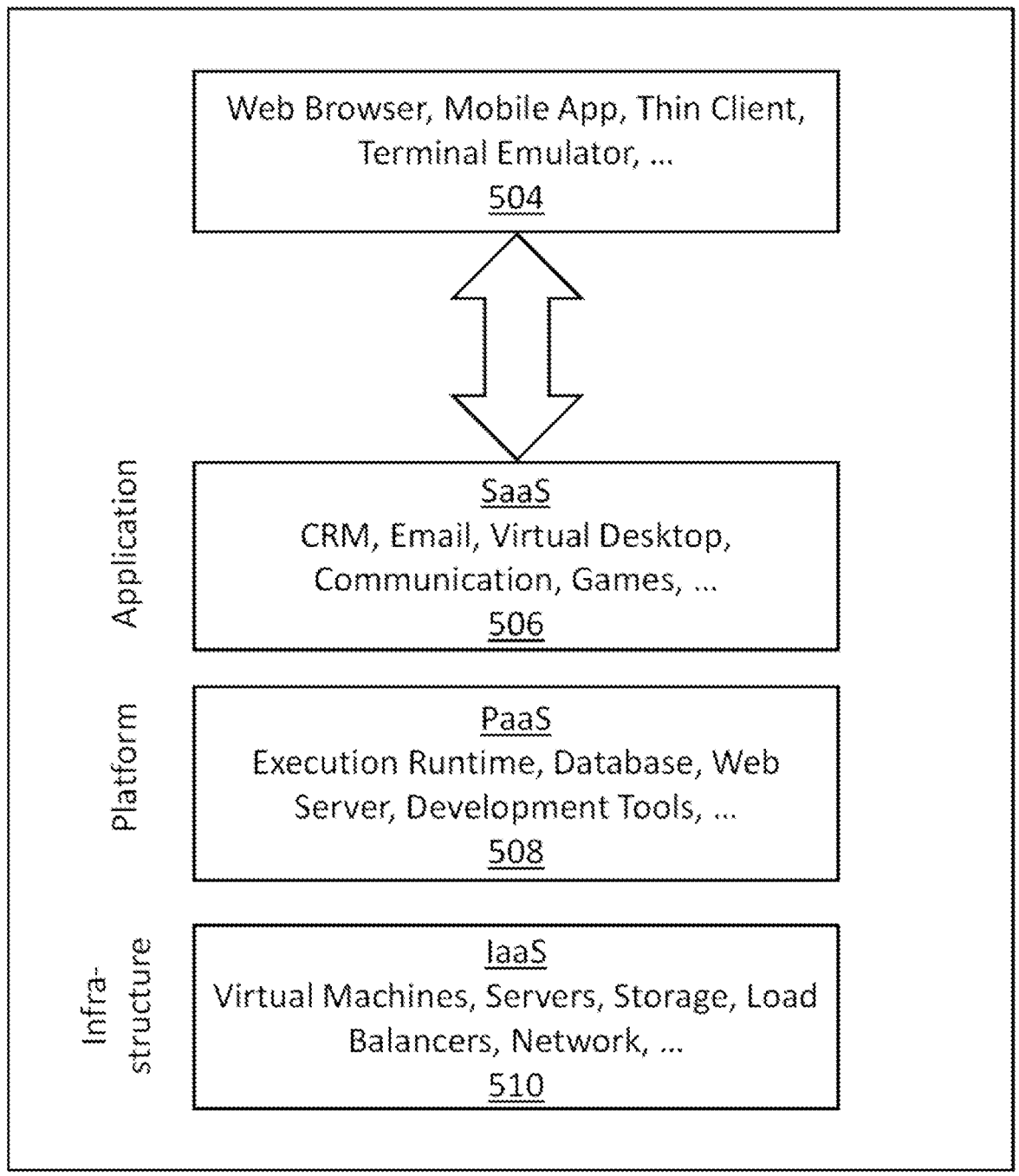
FIG. 5 depicts an exemplary implementation of an architecture according to some embodiments of the present disclosure.

Turning to FIG. 4 and FIG. 5, in some embodiments, the exemplary computer-based systems/platforms, the exemplary computer-based devices, and/or the exemplary computer-based components of the present disclosure may be specifically configured to operate in a cloud computing/ architecture 106 such as, but not limiting to: infrastructure a service (IaaS) 510, platform as a service (PaaS) 508, and/or software as a service (SaaS) 506 using a web browser, mobile app, thin client, terminal emulator or other endpoint 504. FIG. 4 and FIG. 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra), a plurality of platforms, and/or UE 102 and/or sensors 110. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Configuration engine 200, as discussed above and further below in more detail, can include components for the disclosed functionality. According to some embodiments, configuration engine 200 may be a special purpose machine or processor, and can be hosted by a device on network 104, within cloud system 106 and/or on UE 102 and/or UE 110. In some embodiments, engine 200 may be hosted by a server and/or set of servers associated with cloud system 106.

According to some embodiments, as discussed in more detail below, configuration engine 200 may be configured to implement and/or control a plurality of services and/or microservices, where each of the plurality of services/ microservices are configured to execute a plurality of workflows associated with performing the disclosed temperature management. Non-limiting embodiments of such workflows are provided below in relation to at least FIG. 3.

According to some embodiments, as discussed above, configuration engine 200 may function as an application provided by cloud system 106. In some embodiments, engine 200 may function as an application installed on a server(s), network location and/or other type of network resource associated with system 106. In some embodiments, engine 200 may function as application installed and/or executing on UEs 102 and/or 110. In some embodiments, such application may be a web-based application accessed by UEs 102 and/or 110, and/or devices over network 104 from cloud system 106. In some embodiments, engine 200 may be configured and/or installed as an augmenting script, program or application (e.g., a plug-in or extension) to another application or program provided by cloud system 106 and/or executing on UEs 102 and/or 110.

Figure 2:
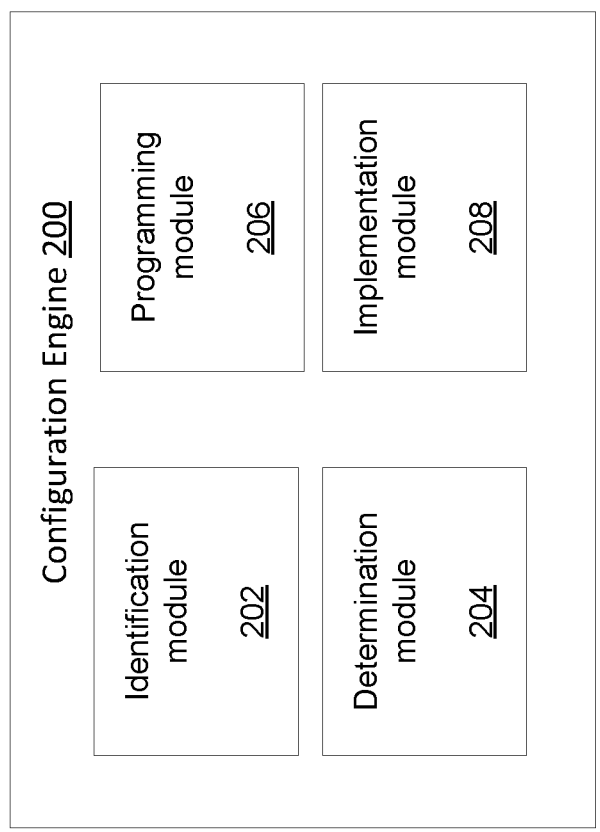
FIG. 2 is a block diagram illustrating components of an exemplary system according to some embodiments of the present disclosure.

As illustrated in FIG. 2, according to some embodiments, configuration engine 200 includes identification module 202, determination module 204, programming module 206 and implementation module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
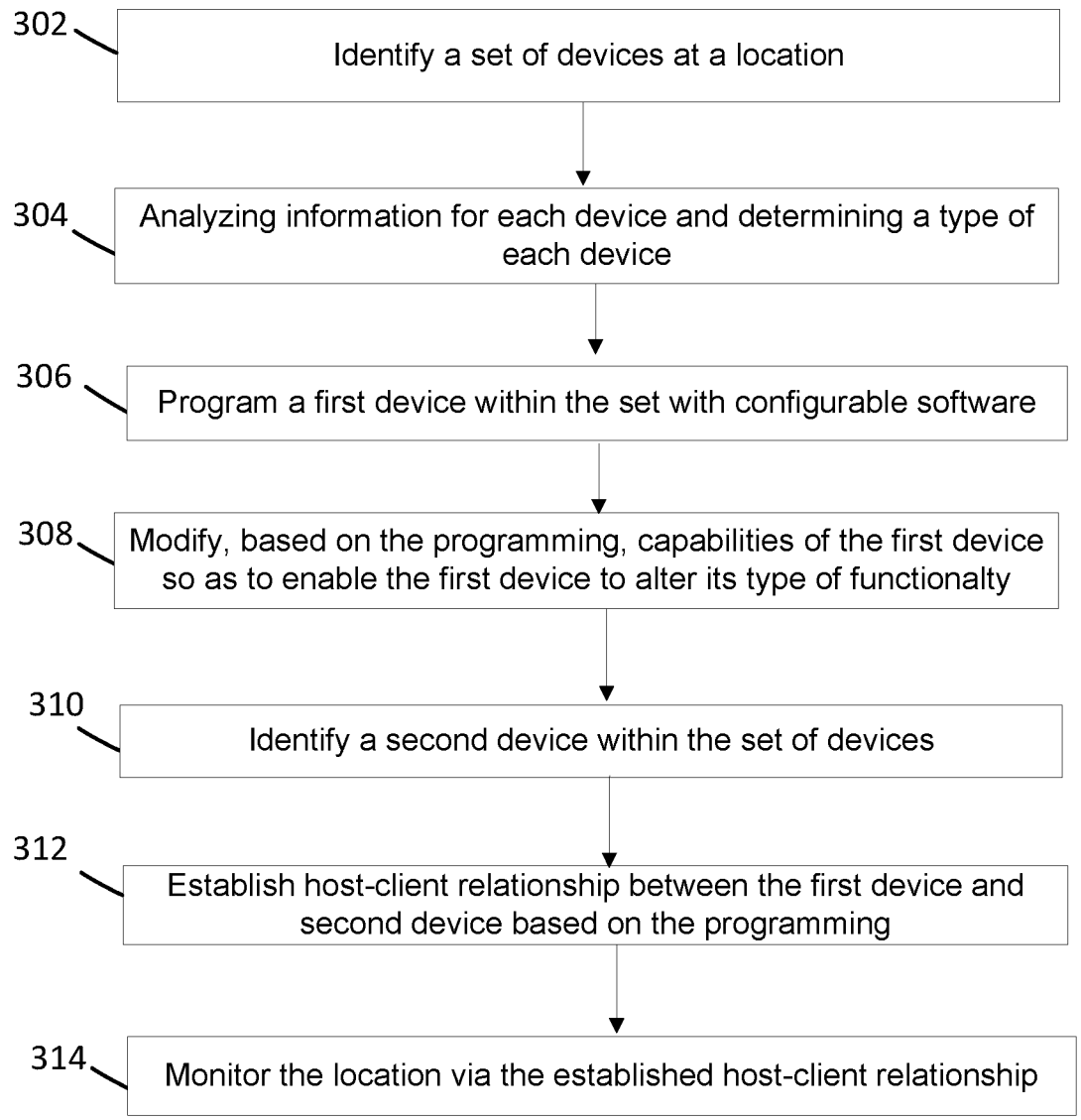
FIG. 3 illustrates an exemplary workflow according to some embodiments of the present disclosure.

Turning to FIG. 3, provided is Process 300 which details non-limiting example embodiments for the disclosed host-client device management framework.

According to some embodiments, Steps 302 and 310 of Process 310 can be performed by identification module 202 of configuration engine 200; Step 304 can be performed by determination module 204; Steps 306-308 can be performed by programming module 206; and Steps 312-314 can be performed by implementation module 208.

According to some embodiments, Process 300 begins with Step 302 where engine 200 identifies a set of devices at a location. For example, with reference to FIG. 1, Step 302 can identify UE 102 and UE 110. In some embodiments, as discussed above, engine 200 can identify UE 102 as a host and UE 110 as a client. In some embodiments, UE 102 can be identified as a host device and UE 110 can be identified as a host device. In some embodiments, UE 102 can be identified as a client device and UE 110 can be identified as a host device.

In some embodiments, the devices identified may not have a specific configuration, in that, they may not be configured as a host or client device.

In some embodiments, Step 302 may involve pinging each device and/or collecting or identifying information related to each device. Thus, in Step 304, engine 200 can analyze the collected or identified information related to each device, and perform a determination regarding each device's inherent or currently programmed capabilities. For example, Step 302 may involve engine 200 receiving information related to the devices at the location and determining that UE 102 and UE 110 are configured as host devices (e.g., they are currently programmed to accept binding requests from other devices that are operating as a client at the location).

According to some embodiments, such computational analysis and determination may involve parsing the device information, deriving, determining, detecting, extracting or otherwise identifying the capabilities of the device therefrom. In some embodiments, such analysis can be performed via any type of known or to be known computational analysis technique, algorithm, mechanism or technology. In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the device data, as discussed herein.

According to some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, as a result of Step 304, engine 200 can properly identify device information related to the devices at the location. In some embodiments, such device information can include, but is not limited to, a device type, operational capabilities, date of programming (e.g., as a host or client), position within a location (e.g., on the wall, ceiling, and the like), objectives (e.g., what type of monitoring is the device used for—for example, security, climate control, and the like), and the like, or some combination thereof. Thus, as discussed herein, engine 200 can identify the set of devices at the location (in Step 302), and receiving or identify information related to each device, which upon the analysis of Step 304, can determine the device information discussed herein.

In Step 306, engine 200 can program a first device within the set of devices at the location with configurable software. In some embodiments, such programming can involve defining or identifying a type of programming data structure that includes executable instructions that when installed and executed on a device can cause the device to operate in a modified (or non-native) manner. In some embodiments, capabilities that can be modified can include, but are not limited to, how the device processes and/or communities signals, how the device stores information, how the device connects to other devices, which network interfaces the device uses, how the device operates to collect data related to the location, in which capacity the device operates (e.g., what type of device is it (e.g., which type of sensor and which type of data is it to collect, for example), and the like, or some combination thereof. In some embodiments, the device identifier may be altered so as to indicate a modified operational status.

In some embodiments, programming of the device may involve erasing the previously stored software on the device and/or overwriting such software with the programmable instructions that enable is modified operation. In some embodiments, only a portion of the operational capabilities being modified may be overwritten.

According to some embodiments, Step 306 can involve identifying that the first device is to be configured with modified capabilities so as to alter how it is configured and/or how it operates within the monitoring environment of the location. For example, UE 102 and UE 110 are identified as both hosts, therefore, UE 110, for example, can be identified as the first device to be modified to alter its capabilities to operate as a client (to the host of the UE 102). In some embodiments, such identification can be based on user input, and in some embodiments, such identification be based on a location, proximity to other devices and/or intended usage of the device.

In some embodiments, host devices may actively be configured to operate in an "enroll mode". This mode can enable the host to be identifiable and/or locate other client devices, thereby providing functionality for active pairing capabilities with other client devices. In some embodiments, the programming discussed herein can involve configurations where the host device is caused to alter its operational state (e.g., exit enroll mode) from a host state to a client sate, whereby the client state corresponds to a different mode of operation (e.g., binding mode-search for and identify host devices). Thus, the first device, for example, can be caused to exit the enroll mode and initiate a newly programmed (via Steps 306-308, discussed herein) binding mode.

Thus, in Step 308, based on the programming in Step 306, the capabilities of the first device are modified, which alters the functionality of the first device. As mentioned above, such altered functionality can involve being able to identify and/or communicate with different types of devices. In some embodiments, Step 308 can involve executing (e.g., installing) the programming data structure communicated in Step 306.

For example, the first device (e.g., UE 110, for example), may initially be operational as a host device; however, via the programed modification in Steps 306-308, the first device can operate as a client device (e.g., a sensor to collect temperature data at the location). Therefore, rather than operating to accept communications from other client devices (e.g., as a host), the first device can operate as a client to perform binding operations with other host devices, and after such connections are established (as discussed herein), communicate collected sensor data to such hosts.

In Step 310, engine 200 can operate to identify a second device at the location. For example, with reference to FIG. 1, engine 200 identify UE 102 (as UE 110 was programmatically modified via Steps 306-308). Thus, in Step 310, at least one other device, besides the device with modified capabilities, at the location can be identified.

In some embodiments, the identification in Step 310 can be based on a type of operational status the first device is currently operating. That is, for example, the first device is operating in a modified state as a client device; therefore, the other identified device(s) may be host devices. Conversely, if the first device is identified as a host device, then the other devices to be identified may be client devices. Thus, Step 310 can enable the identification of other devices so as to enable an established network connection for purposes of establishing a network configuration for the location.

In Step 312, engine 200 can operate so as to enable and/or facilitate the establishment of a host-client relationship between the first device and the second device (from Step 308 and Step 310, respectively). In some embodiments, the host-client relationship can be established via any type of known or to be known mechanisms for pairing devices and their operations, for example—binding operations, Bluetooth, BLE, NFC and the like, as discussed above. In some embodiments, Step 312's relationship/connection can cause or enable the first device (client) to mimic the activities of the second device (host). Thus, the first device can operate based on received instructions from the second device. In some embodiments, the relationship/connection can cause or enable the first device (client) to issue instructions to the second device (host) to perform host related activities (e.g., exit enroll mode, enter enroll mode, as discussed herein, for example).

In Step 314, engine 200 can effectuate monitoring of the location via the established host-client relationship/connection. For example, the first device, being configured as a client device, can operate as a sensor that collects activity data from a location (e.g., related to temperature and/or security events, for example), and relays them to the host second device for analysis and event-based determinations.

Figure 6:
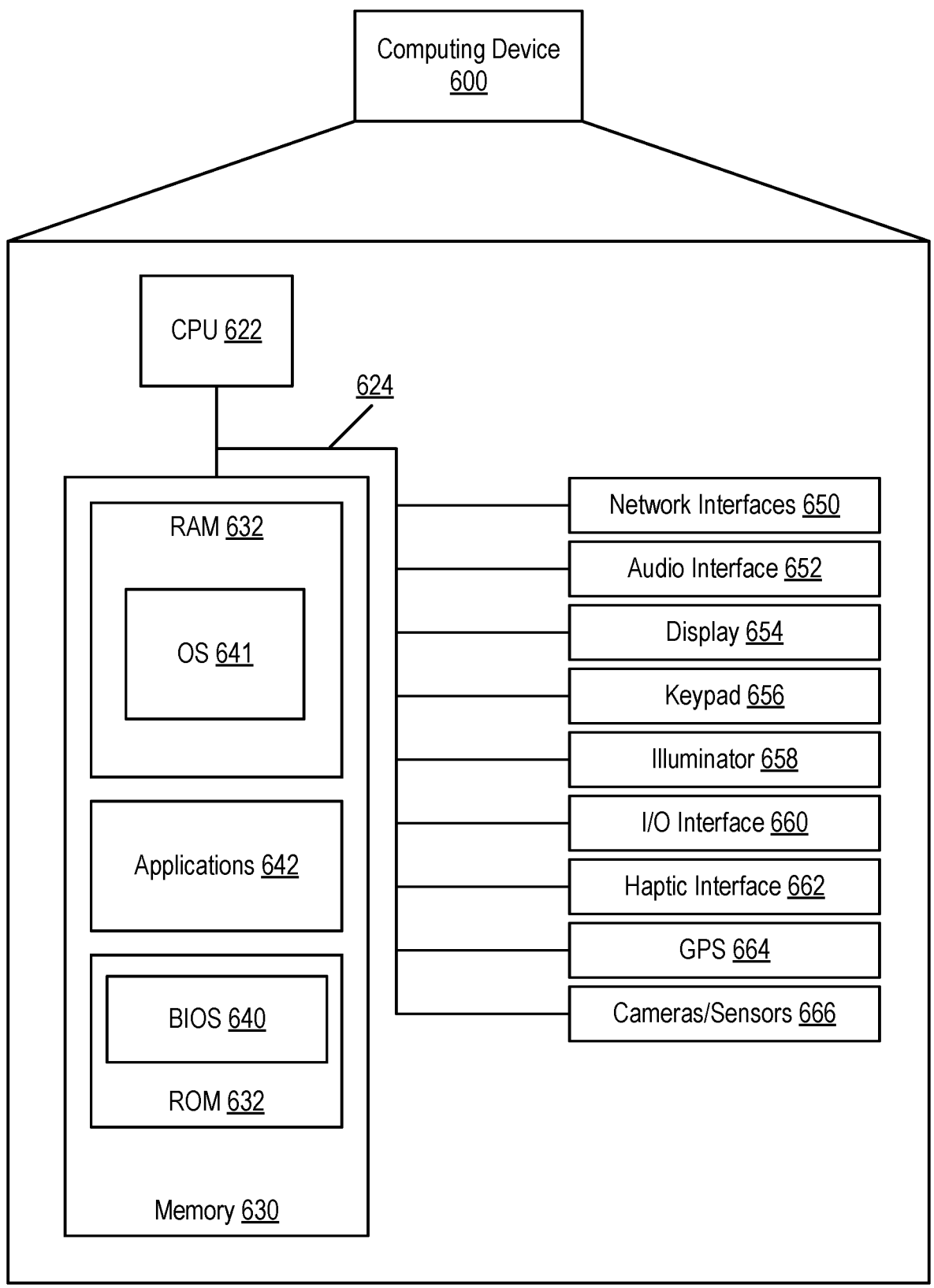
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS or the like, to further determine the physical location of client device 600 on the surface of the Earth. In one embodiment, however, Client device may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    identifying, by a processor, a set of devices associated with a location, the set of devices comprising at least a first host device and a second host device;
    programming, by the processor, the first host device with configurable software, the configurable software comprising non-native functionality for the first host device to modify its capabilities and operate as a client respective to the second host device;
    identifying, by the processor, that the first host device is operating in an enroll mode, the enroll mode enabling client devices to connect to the first host device;
    providing, by the processor, to the first host device, based on the capabilities of the non-native functionality, a request from the second host device for the first host device to exit enroll mode, the request further requesting the first host device operate as the client and enroll with the second host device; and
    configuring, by the processor, the first host device according to the request, the configuration comprising causing the first host device to perform as the client to the second host device.

2. The method of claim 1, wherein the first host device, based on the configuration as a client device, mimics activities of the second host device, wherein the activities are caused by received instructions received from the second host device.

3. The method of claim 1, wherein the first host device, based on the configuration as the client, issues instructions to the second host device to perform host related activities.

4. The method of claim 1, wherein the set of devices further comprises a first client device.

5. The method of claim 4, further comprising:
programming, by the processor, the first client device with the configurable software, the configurable software comprising non-native functionality for the first client device to modify its capabilities and operate as a host at the location.

6. The method of claim 5, wherein the second host device is the configured first client device.

7. The method of claim 1, further comprising:
identifying a programmable data structure, the programmable data structure comprising computer-executable instructions associated with the non-native functionality, the programmable data structure being the configurable software, wherein the programming of the first host device comprises installing and executing the programmable data structure, wherein the execution comprises storing a new version of software on the first host device.

8. The method of claim 1, wherein the configurable software comprises information related to a type of configuration and a type of usage of a to-be configured device.

9. A device comprising:
a processor configured to:
identify a set of devices associated with a location, the set of devices comprising at least a first host device and a second host device;
program the first host device with configurable software, the configurable software comprising non-native functionality for the first host device to modify its capabilities and operate as a client respective to the second host device;
identify that the first host device is operating in an enroll mode, the enroll mode enabling client devices to connect to the first host device;
provide to the first host device, based on the capabilities of the non-native functionality, a request from the second host device for the first host device to exit enroll mode, the request further requesting the first host device operate as the client and enroll with the second host device; and
configure the first host device according to the request, the configuration comprising causing the first host device to perform as the client to the second host device.

10. The device of claim 9, wherein the first host device, based on the configuration as a client device, mimics activities of the second host device, wherein the activities are caused by received instructions received from the second host device.

11. The device of claim 9, wherein the first host device, based on the configuration as the client, issues instructions to the second host device to perform host related activities.

12. The device of claim 9, wherein the set of devices further comprises a first client device.

13. The method of claim 12, wherein the processor is further configured to:
program the first client device with the configurable software, the configurable software comprising non-native functionality for the first client device to modify its capabilities and operate as a host at the location.

14. The device of claim 13, wherein the second host device is the configured first client device.

15. A non-transitory computer-readable storage medium tangibly encoded with computer-executable instructions that when executed by a processor, perform a method comprising:
identifying, by the processor, a set of devices associated with a location, the set of devices comprising at least a first host device and a second host device;
programming, by the processor, the first host device with configurable software, the configurable software comprising non-native functionality for the first host device to modify its capabilities and operate as a client respective to the second host device;
identifying, by the processor, that the first host device is operating in an enroll mode, the enroll mode enabling client devices to connect to the first host device;
providing, by the processor, to the first host device, based on the capabilities of the non-native functionality, a request from the second host device for the first host device to exit enroll mode, the request further requesting the first host device operate as the client and enroll with the second host device; and
configuring, by the processor, the first host device according to the request, the configuration comprising causing the first host device to perform as the client to the second host device.

16. The non-transitory computer-readable storage medium of claim 15, wherein the first host device, based on the configuration as a client device, mimics activities of the second host device, wherein the activities are caused by received instructions received from the second host device.

17. The non-transitory computer-readable storage medium of claim 15, wherein the first host device, based on the configuration as the client, issues instructions to the second host device to perform host related activities.

18. The non-transitory computer-readable storage medium of claim 15, wherein the set of devices further comprises a first client device.

19. The non-transitory computer-readable storage medium of claim 18, further comprising:
programming, by the processor, the first client device with the configurable software, the configurable software comprising non-native functionality for the first client device to modify its capabilities and operate as a host at the location.

20. The non-transitory computer-readable storage medium of claim 19, wherein the second host device is the configured first client device.

* * * * *